United States Patent [19]

Frohn

[11] 4,124,668

[45] Nov. 7, 1978

[54] PROCESS FOR THE REMOVAL AND AFTER TREATMENT OF BLOWN HOLLOW BODIES OF PLASTIC

[75] Inventor: Walter Frohn, Munich, Fed. Rep. of Germany

[73] Assignee: Bell Maschinenfabrik AG, Kriens, Lucerne, Switzerland

[21] Appl. No.: 730,759

[22] Filed: Oct. 7, 1976

[51] Int. Cl.² .................. B29C 17/07; B29C 17/12
[52] U.S. Cl. .................................... 264/40.1; 264/98; 264/161; 264/334; 425/527; 425/806
[58] Field of Search .................. 264/89, 90, 92, 94, 264/96–99, 40.1, 40.3, 161, 334; 425/522, 527, 537, 806 A

[56] References Cited

U.S. PATENT DOCUMENTS 2,992,454  7/1961  Elphee ........................ 425/806 X

FOREIGN PATENT DOCUMENTS 1,479,833  3/1969  Fed. Rep. of Germany .......... 425/522
2,249,570  5/1974  Fed. Rep. of Germany .......... 264/94
1,090,836  11/1967  United Kingdom .............. 425/522
1,233,104  5/1971  United Kingdom .............. 264/94
1,236,189  6/1971  United Kingdom .............. 264/98

Primary Examiner—Jan H. Silbaugh
Attorney, Agent, or Firm—Allison C. Collard

[57] ABSTRACT

A method is provided for removing and finishing blown hollow articles made of plastic in machines for manufacturing blown plastic articles of the type which is provided with at least one blow mold closing unit movable between a hose transfer position, in which position the blow mold closing unit receives plastic hose pieces, and a removal position, in which hose pieces are blown into a hollow article having a calibrated opening and with at least one finishing station for the blown hollow articles. The process is characterized in that the hollow article on its path from the mold closing unit to the finishing station is alternately gripped by internal gripping members and external clamping members which maintain the hollow articles in a stable position during its entire travel through the machine.

14 Claims, 3 Drawing Figures

PROCESS FOR THE REMOVAL AND AFTER TREATMENT OF BLOWN HOLLOW BODIES OF PLASTIC

The subject invention relates to a method for removing and finishing of blown hollow articles which is provided with at least one movable blow mold closing unit disposed between a hose transfer position and a removal position, whereby the blow mold closing unit is suitable for receiving a separated blow mold having a calibration opening, and whereby the machine is provided with at least one finishing station for the blown hollow articles, as well as a machine for carrying out the method.

In many machines for making blown plastic hollow articles, the finished blown hollow article which still carries scrap material, is removed from the machine. To perform the required finishing work of the article to remove at least the scrap material, and also to perform, for example, a leakage test or the printing and labelling of the hollow article, the machine must again be adjusted which is not only very cumbersome but requires additional operators without achieving the required high degree in precision.

It is also known that the blown hollow articles can be removed from the opened blow mold by means of grippers and the articles then fed to a finishing belt. However, in known devices of this type, an exact positioning of the hollow articles defined by the blow mold cannot exactly be maintained. In particular, when scrap material is removed from complicated hollow articles, for example, bottles with handles, or cans with handles, a precise positioning is essential in order to achieve an automatic manufacturing of this working step. Therefore, efforts have been made to remove the hollow article from the blow mold in a position which is stable that is, by maintaining the precise alignment generated by the mold with respect to the machine position for separating the scrap material. This is carried out in known machines in that at a predetermined distance from the extruder head axis, a stationary blowing or calibration mandrel is provided, so that the mold is moved in a reciprocating movement between a position which is directed to the extruder head axis and the blowing or calibrating mandrel. A stamping device for separating the scrap material is connected to the blow mold or the blow mold closing unit, respectively, at the same predetermined distance.

After the hollow article is blown and calibrated, the blowing and calibrating mandrel remains in its blowing and calibrating position while the mold is opened and returns into the hose transfer position beneath the extruder head, so that the stamping device is aligned with respect to the hollow article, which is still mounted on the blowing and calibrating mandrel, so that the stamping device can separate the scrap plastic from the article, provided the article did not fall off from the blowing and calibrating mandrel on which the articles rest due only to shrinkage. Besides the unreliability with respect to the adherance of the hollow articles on the blowing and calibrating mandrel, a further disadvantage exists in that the time for stopping must be as short as the duration of the blow mold closing unit beneath the extruder head to the hose transfer. The required time for the stamping process is composed of the closing of the clamps and the subsequent stamping as well as the opening of the clamps, while the hose transfer only requires the closing of the blow mold. In this known construction, the duration of the blow mold closing unit beneath the extruder head is delayed in dependency from the stamping step which is undesirable because one cannot operate at high extrusion speeds.

It is therefore an object of this invention to provide a method and a machine which permits the blown hollow article to be retained in a stable position during the removal and the finishing steps, so that all required or desired operating steps may be done automatically.

The solution of the object of the aforementioned invention is that the hollow article on its path from the mold to at least one finishing station is alternately gripped by grippers in form of clamping mandrels and clamps, so that the clamping mandrels keep the hollow article in a stable position at the inside wall, while the clamps retain the hollow article in a stable position at the outside wall; that at least some of the grippers are movable for transporting the hollow article between two transfer stations for transferring the hollow article from the preceeding gripper or to the subsequent gripper, respectively; that at least one gripper positions the hollow article into a finishing station; and, that the transfer from one gripper to the next is carried out continuously in that the operating gripper only leaves its gripping position after the subsequent operating gripper has reached its clamping position.

In an advantageous embodiment before the mold is opened, a linear movable clamping mandrel which is in its removal position in axial direction of the calibrating opening, is moved into its one end position into the hollow article which mounted in the mold and is spread into its clamping position within the hollow article; the mold is then opened and the clamping mandrel together with the hollow article is moved into its other end position so that the hollow article is positioned between gripper jaws of an opened clamp which is in one end position laterally and displaceably with respect to the travel movement of the clamping mandrel, whereby the clamp closes into its clamping position encompassing the hollow article; the clamping mandrel is released and moved out of the hollow article and subsequently the hollow article is moved by the clamp into its other end position, wherein a second displaceably clamping mandrel is provided for the hollow article moving in a linear direction of the calibrated opening of the hollow article.

In a further essential embodiment, a clamp is effective as a hold down means for a stamping device for removing plastic scrap material from the hollow article and that in the range of the clamp, a clamping mandrel transfers the hollow article to the clamps: the clamping mandrel then withdraws from the hollow article during the stamping step and again penetrates into the hollow article after the stamping step assuming its clamping position, and after the subsequent opening of the clamp, moves the hollow article out of range of the clamp.

In another advantageous embodiment, a first clamping mandrel removes the hollow body vertically and upwardly from the mold and transfers the same to a first clamp, whereby in a particularly preferable embodiment, the first clamp moves in a horizontal direction between two end positions, whereby the clamp is moved from the first position away from the first clamping mandrel between the opened gripper jaws of a second clamp which serves as a hold down member of a stamping device and in this position a second clamping mandrel receives the hollow article, whereby the first clamp is returned into the range of the first clamping mandrel and subsequently the second clamp is closed.

In a further embodiment, after the second clamp is opened, the hollow body is moved downwardly in a vertical direction by the second clamping mandrel, whereby the hollow article in accordance with one embodiment is moved to a further finishing station wherein a leakage test is performed, while in another embodiment the second clamping mandrel is a pressure test probe, and when the hollow article is lowered, the leakage test is carried out.

In accordance with a further essential embodiment, the printing or labelling of the hollow article is performed in another finishing station. In a particularly advantageous embodiment, the actuation and movement of the clamping mandrels, clamps, and finishing tools is operated automatically by a predetermined serve-hydraulic control program.

To carry out the inventive method, a machine for making blow molded hollow articles is provided having at least one movable blow molding closing unit disposed between a hose transfer position and a removal position, whereby the blow molding closing unit is suitable for receiving a separated blow mold having a calibration opening, and whereby the machine is provided with at least one finishing station for the blown hollow articles, such that in the removal position, a clamping mandrel is provided which is reciprocally movable in a coaxial direction to the calibrating opening of the blow mold, and which engages in its lower end position a hollow article which is positioned in the blow mold; and, in its upper end position, a horizontally reciprocally movable clamp is provided in one end position above the removal position and is engaged in an intermediary position between the gripper jaws of the clamp, whereby the gripper jaws are provided with link-like recesses for gripping the hollow article, and whereby the clamping mandrel and the clamps are aligned with respect to each other in such a way that when the clamping mandrel is in its intermediary position, the hollow article which is retained by the clamping mandrel can be gripped by the clamp.

In an essential embodiment, the clamp in its other end position is disposed between the opened gripper jaws of a second clamp which serves as the stamping tool for removing the plastic scrap material from the hollow article, and that in this second end position, a second vertically and reciprocally movable clamping mandrel is in alignment with the link recesses of the closed gripper jaws of the first clamp and in its upper end position is disposed above the second clamp, in an intermediary position in the range of the second and also in the first clamp which is in its other end position, and in its lower end position beneath the second clamp, so that the clamping mandrel in its intermediary position is suitable for gripping the hollow articles which are encompassed by the first or second clamp.

In a further advantageous embodiment, the gripper jaws of the second clamp are provided with link-like hold down members for the hollow articles and that one of the gripper jaws is provided with stamping tools.

In a further advantageous embodiment, the second mandrel of the hollow body orifice is provided with associated sealing elements and is provided within its inside with a flow medium pressure line which is connected with a device for leakage testing.

In a further essential embodiment, in the range of the lower end position of the second clamping mandrel, the end position of a third horizontally and reciprocally movable clamp is provided while the other clamp which is in the range of a further finishing station, and a third clamping mandrel is provided which is vertically and reciprocally movable.

In a further embodiment, in the range of the lower end position of the second clamping mandrel, a transport belt is provided for the hollow articles which are released from the second clamping mandrel.

In a particularly essential embodiment, the clamping mandrels and the link-like inserts of the gripper jaws are exchangeable with other inserts or clamping mandrels, or if need be, serve as multiple tools.

Figure 1:
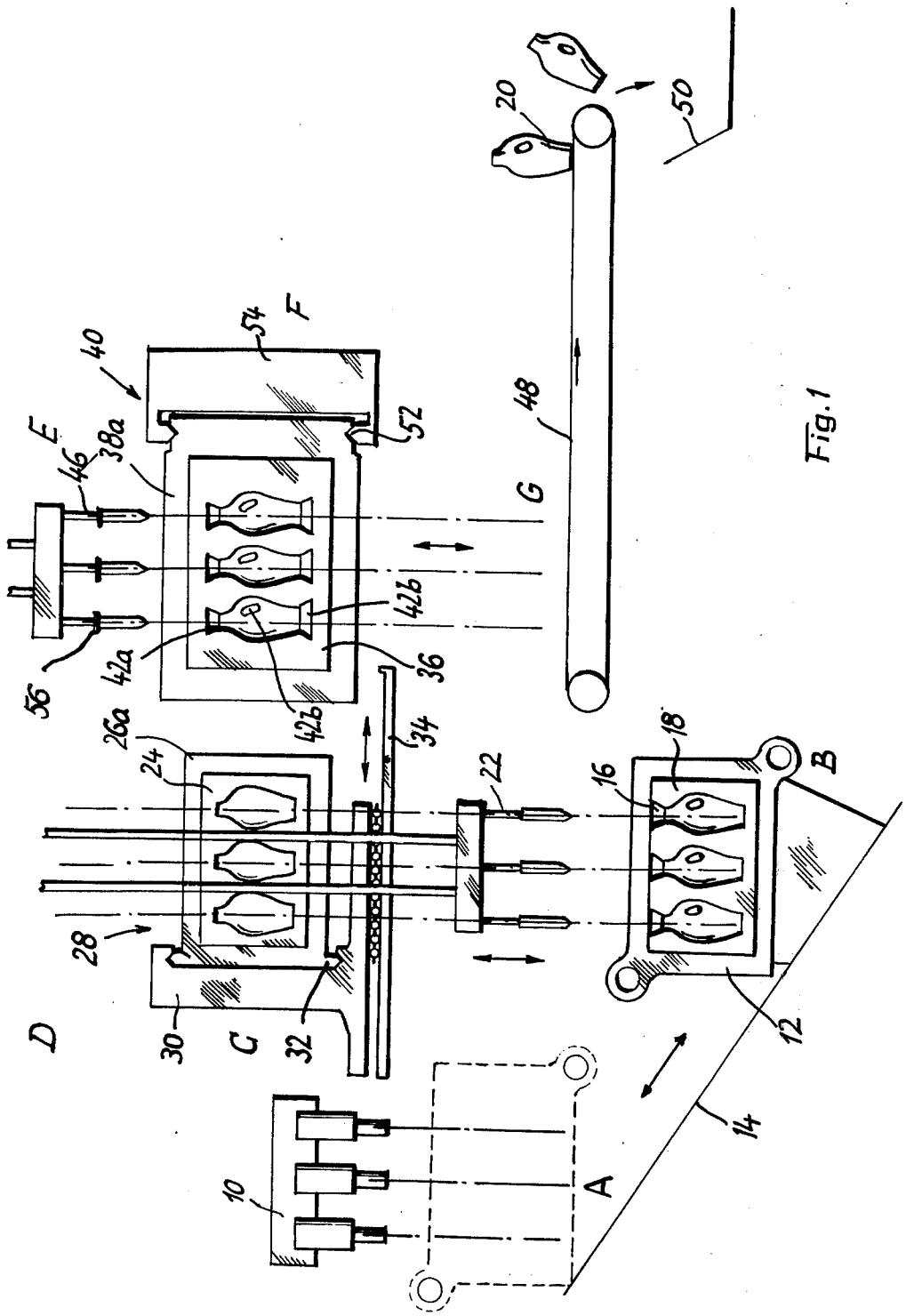
FIG. 1 is a schematic side view of the inventive machine whereby the extruder is shown only in the form of an extruder head.

The drawing shows schematically a triple extruder head 10. To transfer the extruded parallel plastic hoses, a blow mold closing unit 12 is provided with a triple mold in a hose transfer position A, which is subsequently closed in known manner and moved with the separated hose pieces into a removal position B along an oblique guide 14. (As shown, for example, in U.S. patent application Ser. No. 415,863, now U.S. Pat. No. 3,998,576). In this removal position B, known calibrating mandrels (not shown) penetrate into calibrating orifices 16 on the upper side of mold 18, whereby in known manner, the hose pieces are blown into hollow articles 20 and the orifices of the articles are claibrated. After a certain cooling period, the calibrating mandrels are removed, so that calibrating orifices 16 are freely accessible from above.

A first clamping mandrel, that is, a first clamping mandrel group 24 which is in a triple configuration due to the chosen embodiment, is vertically moved into the blow mold and guided into the hollow articles, and comes to rest within the hollow articles in a lower end position, whereupon spreading elements (not shown) which are provided on the clamping mandrels are spread outwardly, and engage against the inner wall of the hollow articles. The hollow articles are thus maintained in a stable position with respect to clamping mandrel 22, whereby the position is predetermined by the mold. If need be, the spreading elements must be suitably constructed so as to accomodate and assure the stable position of the hollow articles.

Figure 3:
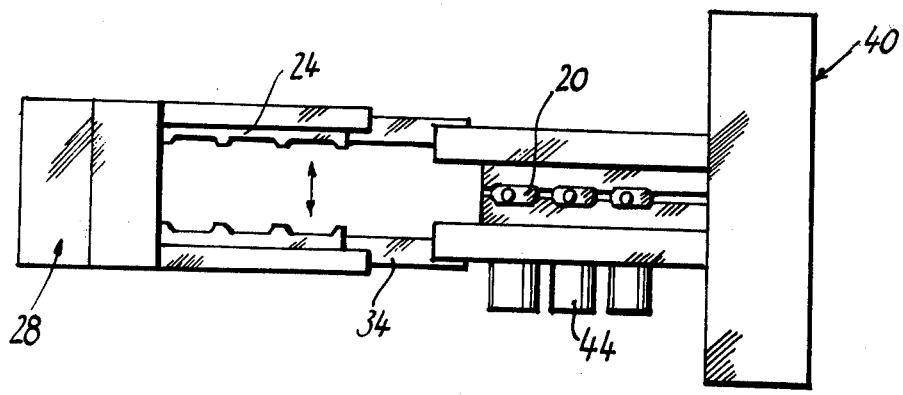
FIG. 3 is a plan view according to FIG. 2 after three hollow articles are received by the second clamp.

At this point, blow mold 18 is opened, so that clamping mandrel 22 moves upwardly into an intermediary position C wherein the hollow articles are aligned with respect to link like groups 24 which are exchangeably mounted on two opposite gripper jaws 26a and 26b which are displaceable with respect toward each other and are mounted on a first clamp 28. While the clamping mandrel moves from the mold into intermediary position C, gripper jaws 26a and 26b of the first clamp are in an opened position (FIG. 3). As soon as clamping mandrel 22 has reached intermediary position C, gripper jaws 26a and 26b close and grip the hollow articles in a stable position with mold groups 24, whereupon clamping mandrel 22 is released from the hollow articles and is transferred into its upper end position D, at which point it is located above first clamp 28.

The first clamp 28 is provided with a base element 30 on which gripper jaws 26a and 26b are movably supported in a schematically indicated guide 32. A suitable but rather unimportant drive for generating the gripper movement may be provided for in base element 30. Base element 30 is mounted on rollers on horizontal guide 34 and may be moved by a further drive element (not shown) along this guide until link-like mold groups 24 are aligned in horizontal lateral longitudinal direction of guide 34 with similar mold group 36 being exchangeably mounted in the form of hold down members of a stamping device on gripper jaws 38a and 38b respectively; on a second clamp 40, mold groups 46 are provided with schematically shown apertures 42a, 42b and 42c to receive stamping tools for removing plastic scrap material, whereby these tools are mounted in gripper jaws 38b and are actuated by schematically shown drives at 44.

In order to transfer the hollow articles from first clamp 28 to second clamp 40, a second vertically movable clamping mandrel group 46 is provided which in its one end position E is above second clamp 40 (FIG. 1); in an intermediary position F is brought into contact with the hollow articles held by either the first or second clamp; and in its other end position G, moves the hollow articles from intermediary position F downwardly where, for example, the hollow articles are placed onto a transport belt 48 and are finally dropped off into a container 50, or whereby in one embodiment, a third clamp corresponding to clamp 28 receives the hollow articles in a stable position and transfers the hollow articles by means of a third clamping mandrel, which would correspond to mandrel 22, into a further finishing station. Since the third clamp and the third clamping mandrel correspond in their construction, arrangement and function to the first clamp or the first clamping mandrel, respectively, we dispensed with a particular showing of the same. It is obvious that the transport chain for moving the hollow articles in a stable position essentially consist of clamps on the one hand and of clamping mandrels, on the other hand, whereby this chain may be extended in accordance with the desired requirements.

Figure 2:
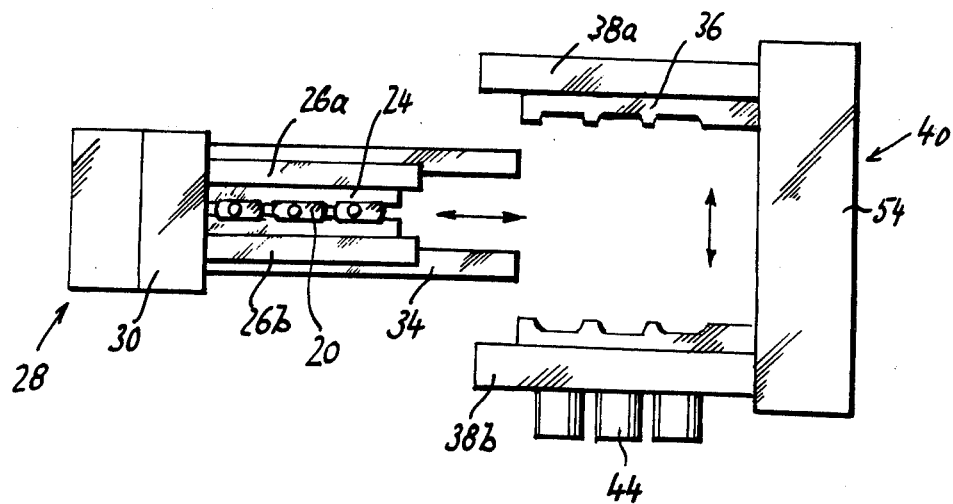
FIG. 2 is a schematic plan view of the first and second clamp after receiving three hollow articles from the first clamping mandrel.

Gripper jaws 38a or 38b of second clamp 40 are displaceably mounted in a horizontal guide 52 at stationary base element 54 of this second clamp 40 and are movable towards or away from each other by a suitable drive (not shown), as can be seen in FIGS. 2 and 3. In the opened position as in FIG. 2 showing second clamp 40, first clamp 28 which carries the hollow articles may be moved into position F, whereby the second clamp or clamping mandrel group 46 is lowered from position E, and grip the hollow article in a stable position. Thereupon, first clamp 28 in FIGS. 1 or 2 is moved to the left side, so that second clamp 40 can enclose the hollow article from the outside and grip the same in a stable position, whereupon the second clamping mandrel group 46 is moved back into the upper end position E; the stamping tools for separating the scrap material are actuated and the second mandrel group 46 is moved back into intermediary position F while the hollow articles are gripped by the second clamping mandrel group; the second clamp is opened from its closed position as shown in FIG. 3, and the hollow articles are lowered into position G by the second clamping mandrel group. The second clamping mandrel group 46 thus may essentially be provided as a probe for leak testing. For this purpose, the individual clamping mandrels of clamping mandrels group 46 are provided with sealing elements 56 which sealingly engage the orifices of the hollow articles, and the mandrels are in an engaged position within the hollow articles. Furthermore, flow media lines guide pressure fluid to the various segments inside a hollow article, so that a short admittance of pressure liquid proves that the hollow articles are free of leakage whereby the pressure lines are connected with a known test device, while the hollow articles are lowered from position F, after the stamping step, into position G.

After the second clamping mandrel group 46 returns from position G and into its upper end position E, first clamp 28 may again move into the range between gripper jaws 38a and 38b of second clamp 40 and transfer other hollow articles to the stamping step. Should one of the cycled finishing steps take more time than the time period between two successive removals from mold 18, in view of the rather high extruding speed, the speed of the finishing station may be doubled, whereby in front of each finishing station a clamping material is added and also an additional clamp, so that the clamping mandrel during its transfer at the vertical movement may be alternately present within the range of either one or the other clamps for transferring the hollow article. Thereby, the time period for the cycle in the finishing station is doubled.

In an essential embodiment of the invention all described movements are servo hydraulically controlled by a program defined by the hollow articles to be produced.

What is claimed is:

1. A method for removing and finishing of blown hollow articles made of plastic in machines for manufacturing blown plastic articles, the machines being provided with at least one blow mold closing unit movable between a hose transfer position, in which position said blow mold closing unit receives plastic hose pieces, and a removal position, in which at least one hose piece is blown into a hollow article having a calibrated opening, and with at least one finishing station for the blown hollow article, comprising the steps of:

(a) internally gripping the blown hollow article disposed in said blow molding closing unit with first gripping means reciprocally movable between an end engaging position, an intermediate transfer position and an end rest position, by moving said first gripping means into said end engaging position thereof and inserting said first gripping means into the opening of said article, said gripping means maintaining said articles in a stable position by securely engaging the inner wall thereof;

(b) moving said first gripping means with said article gripped thereby to said intermediate transfer position thereof;

(c) externally clamping the article with first clamping means reciprocally movable between said intermediate transfer position and a second intermediate transfer position, said clamping means maintaining said article in a stable position by securely engaging the exterior wall thereof;

(d) releasing said first gripping means from engagement with said article and moving said gripping means to said end rest position thereof;

(e) moving said first clamping means, with said article gripped thereby to said second intermediate position;

(f) internally gripping the article with second gripping means reciprocally movable between an end rest position, said second intermediate transfer position and an end release position, by moving said second gripping means into said second intermediate transfer position and inserting said second gripping means into the opening of said article, said second gripping means maintaining said article in a stable position by securely engaging the inner wall thereof;

(g) releasing said first clamping means from engagement with said article and moving said first clamping means to said intermediate transfer position thereof;

(h) externally clamping said article with second clamping means, disposed at said second intermediate transfer position, said second clamping means maintaining said article in a stable position by securely engaging the exterior wall thereof;

(i) releasing said second gripping means from engagement with said article and moving said second gripping means to said end rest position thereof;

(j) performing a finishing operation on said article by means of finishing tools at said second intermediate position;

(k) moving said second gripping means from said end rest position to said second intermediate transfer position and internally gripping said article by said second gripping means;

(l) releasing said second clamping means from engagement with said article and moving said second gripping means with said article gripped thereby to said end release position thereof;

(m) releasing said article from said second gripping means at said end release position thereof and moving said second gripping means to said end rest position thereof; and (n) discharging the finished articles from the machine.

2. The method according to claim 1, wherein said first and second gripping means are reciprocally movable in a linear direction between said end positions thereof coaxial with the calibrated opening of said blown article, wherein said first and second gripping means each comprises an expandable gripping mandrel which may be expanded and retracted, and wherein said internal gripping and releasing steps by means of said first and second gripping means are effected by expanding and retracting, respectively, said gripping mandrels.

3. The method according to claim 2, wherein said first and second clamping means each comprise a pair of laterally-opposed, cooperating clamping jaws movable between an open and closed position relative to said article, and wherein said external clamping and releasing steps by means of said first and second clamping means are effected, respectively, by closing and opening said pairs of clamping jaws.

4. The method according to claim 3, wherein said second clamping means includes a hold down means for a stamping tool for removing plastic scrap material from said hollow article and wherein said step of performing a finishing operation includes removing plastic scrap material from said hollow article by means of a stamping tool.

5. The method according to claim 4, wherein said first gripping means is moved in a vertical direction between said end positions thereof.

6. The method according to claim 5, wherein said first clamping means is moved in a horizontal direction between said intermediate position and said second intermediate position.

7. The method according to claim 6, wherein said second gripping means is moved in a vertical direction between said end positions thereof.

8. The method according to claim 7, wherein said step of performing a finishing operation includes performing a leakage test on said hollow article.

9. The method according to claim 8, wherein said second gripping means includes a pressure probe which performs said leakage test when said second gripping means is moved from said second intermediate position to said end release position thereof.

10. The method according to claim 9, including the steps of automatically actuating and moving said first and second gripping means and clamping means, and finishing tools by a predetermined servo hydraulic control program.

11. The method according to claim 9, additionally including the step of sealingly engaging the opening of said hollow article by means of sealing elements associated with said second gripping means and connecting said pressure probe thereof via a flow medium pressure line to a leak testing device during said step of performing said leakage test.

12. The method according to claim 4, wherein said hold down means comprises link-like hold-down members mounted on said pair of gripping jaws of said second clamping means for externally clamping said hollow article, and wherein said stamping tool is mounted on said pair of gripping jaws of said second clamping means.

13. The method according to claim 1 additionally including the steps of following step (1), externally clamping the article with third clamping means reciprocally movable between said end release position and a third transfer position, said third clamping means maintaining said article in a stable position by securely engaging the exterior wall thereof, and following step (m), moving said third clamping means with said article gripped thereby to said third transfer position; internally gripping the article with third gripping means reciprocally movable between an end rest position, said third transfer position and an end release position, by moving said third gripping means into said third transfer position and inserting said third gripping means into the opening of said article, said third gripping means maintaining said article in a stable position by securely engaging the inner wall thereof; releasing said third clamping means from engagement with said article and moving said third clamping means to said end release transfer position; externally clamping said article with fourth clamping means for maintaining said article in a stable position by securely engaging the exterior wall thereof; releasing said third gripping means from engagement with said article and moving said third gripping means to said end rest position thereof, performing a finishing operation on said article by means of finishing tools at said third transfer position; moving said third gripping means from said end rest position to said third transfer position and internally gripping said article by said third gripping means; releasing said fourth clamping means from engagement with said article and moving said third gripping means with said article gripped thereby to said end release position thereof; and releasing said article from said third gripping means at said end release position thereof.

14. The method according to claim 1, wherein said discharging step comprises releasing said hollow articles from said second gripping means when in said end release position thereof onto a transport belt disposed beneath said second clamping means.

* * * * *